(12) United States Patent
    Chen

(10) Patent No.: US 9,367,118 B2
(45) Date of Patent: Jun. 14, 2016

(54) COMPUTER SYSTEM AND OPERATING METHOD THEREOF

(71) Applicants: Inventec (Pudong) Technology Corporation, Shanghai (CN); INVENTEC CORPORATION, Taipei (TW)

(72) Inventor: Chia-Hsiang Chen, Taipei (TW)

(73) Assignees: Inventec (Pudong) Technology Corporation, Shanghai (CN); INVENTEC CORPORATION, Taipei City (TW)

( * ) Notice: Subject to any disclaimer, the term of this patent is extended or adjusted under 35 U.S.C. 154(b) by 204 days.

(21) Appl. No.: 14/228,240

(22) Filed: Mar. 27, 2014

(65) Prior Publication Data

US 2015/0089252 A1    Mar. 26, 2015

(30) Foreign Application Priority Data

Sep. 22, 2013  (CN) .......................... 2013 1 0431977

(51) Int. Cl.
    *G06F 1/26*    (2006.01)
    *G06F 1/32*    (2006.01)
(52) U.S. Cl.
    CPC ............ *G06F 1/3234* (2013.01); *G06F 1/3206* (2013.01)

(58) Field of Classification Search
    CPC ............................. G06F 1/3206; G06F 1/3234
    See application file for complete search history.

(56) References Cited

U.S. PATENT DOCUMENTS

| | | | | |
|---|---|---|---|---|
| 7,418,608 B2 * | 8/2008 | Kumar | ................... | G06F 1/3203 713/300 |
| 2005/0283624 A1 * | 12/2005 | Kumar | ................... | G06F 1/3203 713/300 |
| 2014/0115357 A1 * | 4/2014 | Li | ......................... | G06F 1/3206 713/320 |

\* cited by examiner

*Primary Examiner* — Abdelmoniem Elamin
(74) *Attorney, Agent, or Firm* — CKC & Partners Co., Ltd.

(57) ABSTRACT

A computer system and an operating method thereof are disclosed herein. The operating method includes determining an operating state of a logic device; receiving a present power level of a mainboard; comparing the present power level of the mainboard with a present power level threshold of the mainboard, and determining whether to generate an alert signal accordingly; selectively providing the alert signal to a system controller or a baseboard management controller (BMC) according to the operating state; and adjusting, through one of the system controller and the BMC, whichever receives the alert signal, the present power level threshold of the mainboard.

6 Claims, 3 Drawing Sheets the invention as claimed.

COMPUTER SYSTEM AND OPERATING METHOD THEREOF

RELATED APPLICATIONS

This application claims priority to Chinese Application Serial Number 201310431977.4, filed Sep. 22, 2013, which is herein incorporated by reference.

BACKGROUND

1. Field of Invention

The present invention relates to a computer system and an operating method thereof. More particularly, the present invention relates to a computer system with a baseboard management controller and a method for operating the computer system.

2. Description of Related Art

With the rapid advancement of electronics technology, various types of computer systems (for example, personal computers and servers) are widely used in our everyday lives.

Generally speaking, a server system usually includes a chassis management controller (CMC) for monitoring a server. For example, the CMC can monitor the present power level of the server so as to properly respond to abnormal power level conditions.

However, because the CMC performs tasks which are varied and complicated, the CMC is prone to delay, and this may result in the CMC failing to timely respond to an abnormal power level situation of a server. The CMC fails to timely respond to an abnormal power level situation of a server also when it is reset. Such untimely response may result in a faulty or unstable server system.

SUMMARY

A computer system and an operating method thereof are provided. The operating method is used with the computer system which includes a system controller and a mainboard. The mainboard includes a baseboard management controller (BMC) and a logic device. The operating method includes the following steps. First, an operating state of the logic device is determined by the system controller. The logic device receives a present power level of the mainboard and compares the present power level with a present power level threshold of the mainboard. According to the comparison between the present power level and a present power level threshold of the mainboard, the logic device determines whether to generate an alert signal. In addition, the logic device selectively provides the alert signal to the system controller or the BMC according to the operating state. Finally, the system controller or the BMC, whichever receives the alert signal, adjusts the present power level threshold of the mainboard in accordance with the alert signal.

The invention provides a computer system including a system controller and a mainboard. The mainboard includes a baseboard management controller (BMC) and a logic device. The logic device receives a present power level of the mainboard and compares the present power level of the mainboard with a present power level threshold of the mainboard. According to the comparison between the present power level and the present power level threshold of the mainboard, the logic device determines whether to generate an alert signal. In addition, the system controller determines an operating state of the logic device, and the logic device selectively provides the alert signal to the system controller or the BMC according to the operating state. The system controller or the BMC, whichever receives the alert signal, adjusts the present power level threshold of the mainboard in accordance with the alert signal.

A computer system is implemented through the foregoing example. The system controller can determine the operating state of the logic device according to the operating state of the computer system so that the BMC acts for the system controller to receive the alert signal and adjust the present power level threshold of the mainboard. Thus, more options to manage the power level of the computer system are provided so that the situation where the system controller fails to timely deal with abnormal power level conditions of the mainboard is prevented and stability of the computer system is improved.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1:
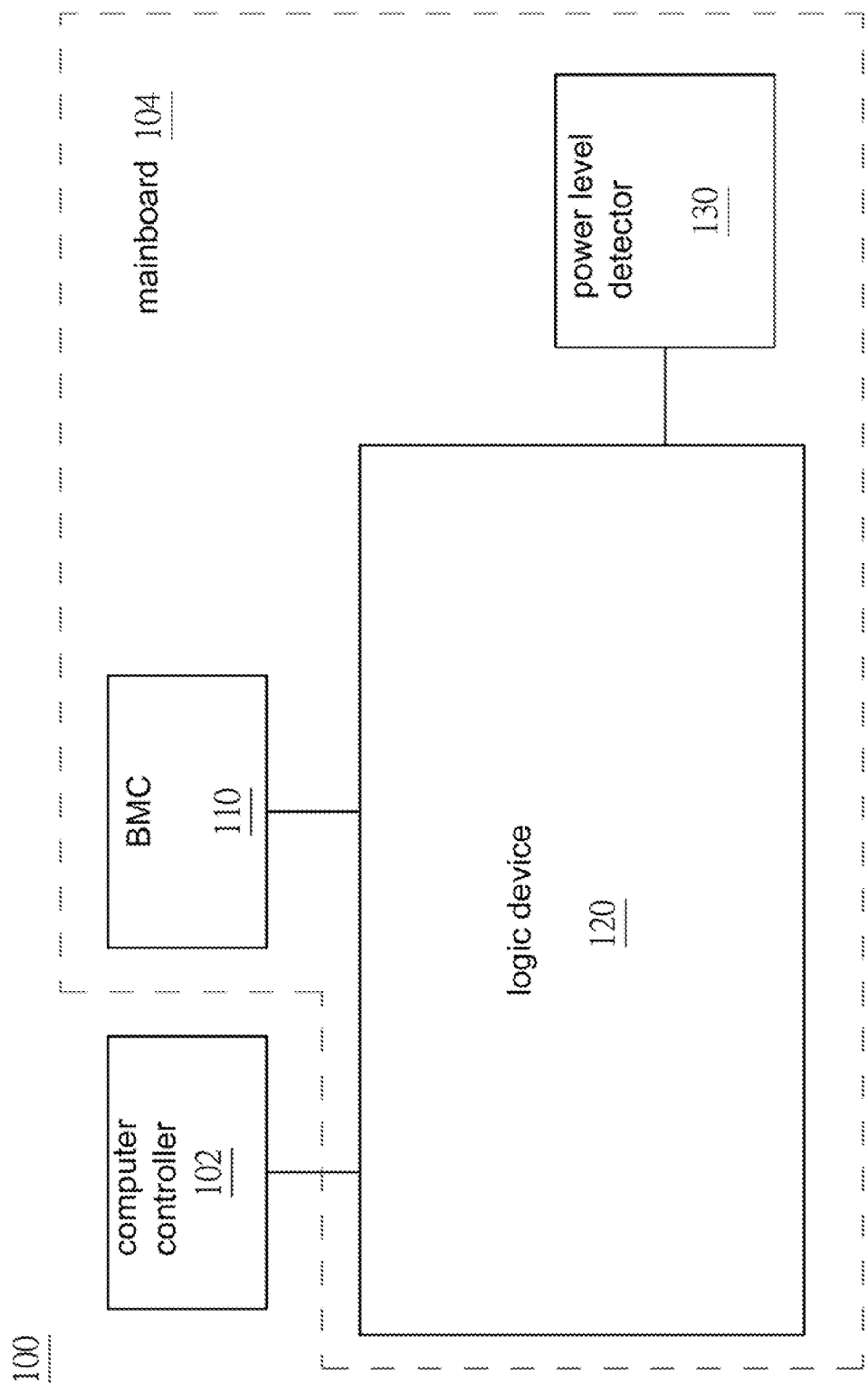
FIG. 1 is a block diagram illustrating a computer system in accordance with one embodiment of the present invention.

Reference will now be made in detail to the present embodiments of the invention, examples of which are illustrated in the accompanying drawings. Wherever possible, the same reference numbers are used in the drawings and the description to refer to the same or like parts.

The present invention discloses a computer system. The following description illustrates embodiments of a server system. The present invention is not limited to the embodiments.

FIG. 1 is a block diagram illustrating a computer system 100 in accordance with an embodiment of the present invention. According to the embodiment, the computer system 100 may include a computer controller 102 and a mainboard 104. The computer controller 102 and the mainboard 104 are electrically coupled each other. The mainboard 104 includes a baseboard management controller (BMC) 110, a logic device 120, and a power level detector 130. The logic device 120 may be electrically coupled to each of the computer controller 102, the BMC 110, and the power level detector 130. It is noted that the number of the aforementioned elements is not limited to what the embodiment discloses, and moreover, interconnections among the aforementioned elements are not limited to what the embodiment discloses. Any number of the aforementioned elements and any interconnection among the aforementioned elements which can be implemented in the computer system 100 are within the scope of the present invention.

According to the embodiment, the computer controller 102 may be a chassis management controller (CMC). For example, the computer controller 102 may be implemented using a central processing unit or microprocessor. The mainboard 104 may be a blade server board. The BMC 110 may be implemented using a central processing unit or microprocessor. The logic device 120 may be a programmable logic device (PLD), a complex programmable logic device (CPLD), or a field-programmable gate array (FPGA). The power level detector 130 is implemented using electrical circuits.

According to the embodiment, the power level detector 130 may be used to detect a present power level of the mainboard 104 and provide the detected present power level to the logic device 120.

The logic device 120 stores a present power level threshold of the mainboard 104. The logic device 120 may used to receive the present power level of the mainboard 104 and compare the present power level of the mainboard 104 with the present power level threshold of the mainboard 104. The logic device 120 generates an alert signal when the present power level is larger than the present power level threshold.

The logic device 120 may provide the alert signal to the computer controller 102 so that the computer controller 102 controls the overall state of the computer system 100 according to the alert signal (for example, the present power level threshold of the mainboard 104 is adjusted to correspond to actual operating conditions). However, the computer controller 102 usually performs complicated tasks (e.g., monitoring the conditions of other circuit boards (not shown)), and therefore, upon receiving the alert signal, the computer controller 102 performs corresponding control in a delayed manner. Thus, such delay causes the computer system 100 to be faulty or unstable.

Therefore, according the embodiment, the logic device 120 may have a first operating state and a second operating state. The computer controller 102 determines the operating state of the logic device 120 according to the overall operating state of the computer system 100.

In greater detail, in the first operating state, the logic device 120 may provide an alert signal to the BMC 110 so that the BMC 110 performs corresponding control according to the alert signal (for example, the present power level threshold of the mainboard 104 is adjusted so that the present power level threshold of the mainboard 104 corresponds to actual operating conditions).

In the second operating state, the logic device 120 may provide an alert signal to the computer controller 102 so that the computer controller 102 performs corresponding control according to the alert signal (for example, the present power level threshold of the mainboard 104 is adjusted so that the present power level threshold of the mainboard 104 corresponds to actual operating conditions).

Therefore, when the computer controller 102 is overloaded or before the computer controller 102 is reset, the computer controller 102 may switch the operating state of the logic device 120 (e.g., switch the second operating state to the first operating state) so that the logic device 120 provides the alert signal to the BMC 110. Moreover, when the computer controller 102 returns to a normal load again or after the computer controller 102 is reset, the computer controller 102 may switch the operating state of the logic device 120 (e.g., switch the first operating state to the second operating state) so that the logic device 120 provides the alert signal to the computer controller 102.

Through the aforementioned embodiment, the computer controller 102 may determine the operating state of the logic device 120 depending on the overall operating state of the computer system 100 so that the BMC 110 acts for the computer controller 102 to receive the alert signal and adjust the present power level threshold of the mainboard 104. Thus, more options to manage the power level of the computer system 100 are provided so that the situation where the system controller 100 fails to timely deal with abnormal power level conditions of the mainboard 104 is prevented and stability of the computer system is improved.

According to the embodiment of the present invention, regardless of whether the logic device 120 is in the first operating state or the second operating state, the logic device 120 may provide the present power level threshold of the mainboard 104 to the computer controller 102 and the BMC 110, so that both the computer controller 102 and the BMC 110 are aware of the present power level threshold of the mainboard 104.

Furthermore, according to the embodiment, the computer controller 102 may determine the operating state of the logic device 120 according to the present power level threshold of the mainboard 104.

For example, a state in which the present power level threshold of the mainboard 104 is larger than a predetermined threshold (e.g. 150W) indicates that the mainboard 104 has a somewhat heavy load, necessitating timely and proper control according to the alert signal so as to prevent a fault. Thus, the computer controller 102 may set the operating state of the logic device 120 to the first operating state so that the BMC 110 may perform proper control according to the alert signal.

A state in which the present power level threshold of the mainboard 104 is not larger than a predetermined threshold indicates that the mainboard 104 has a low load. As a result, the computer controller 102 may set the operating state of the logic device 120 to the second operating state.

The following description illustrates another embodiment of the present invention. However, the scope of the present invention is not limited to this embodiment.

Figure 2:
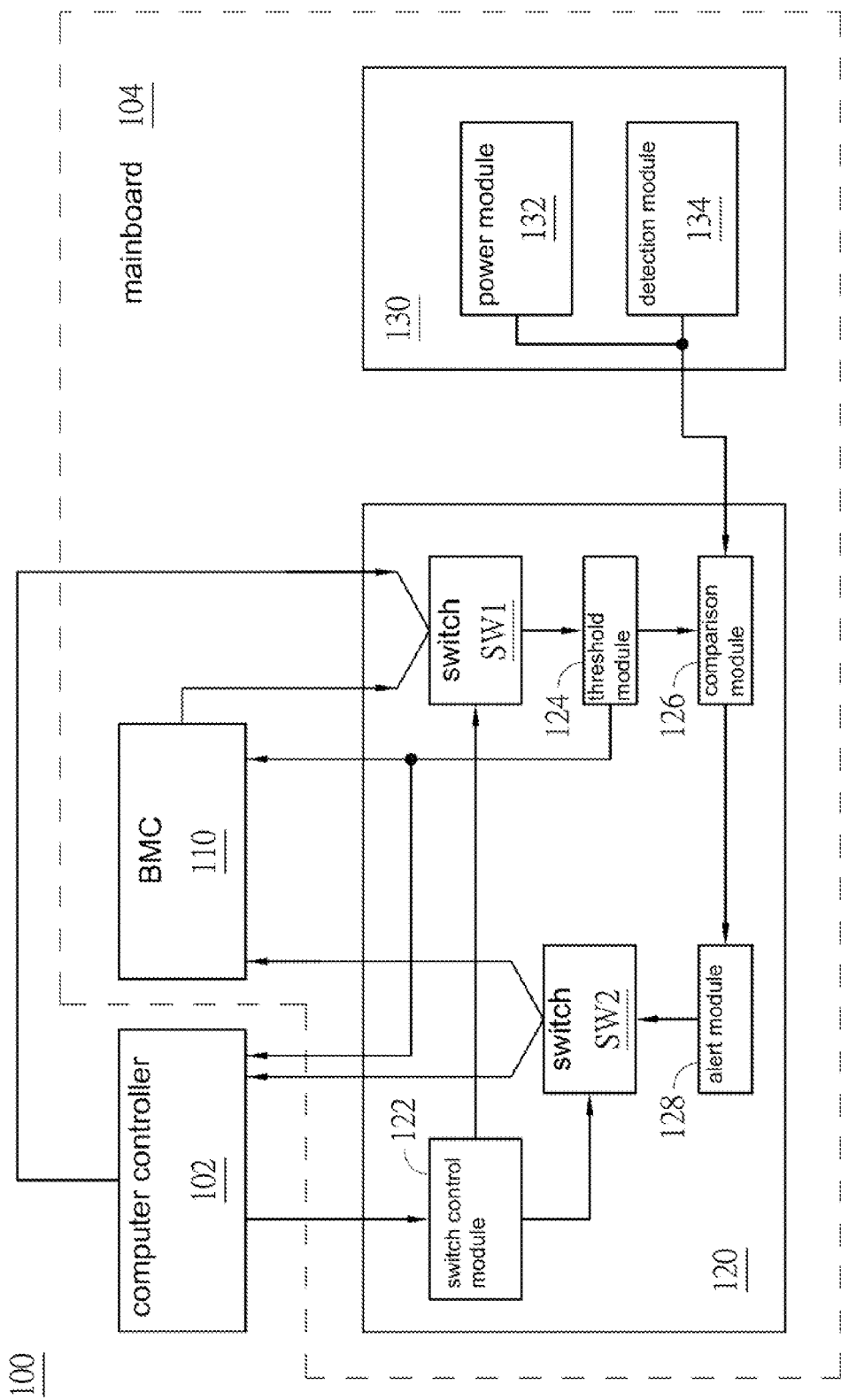
FIG. 2 is a block diagram illustrating a computer system according to another embodiment of the present invention.

FIG. 2 is a block diagram illustrating a computer system 100 according to another embodiment of the present invention. Interconnections among the elements of the computer system 100 have already been disclosed in the foregoing embodiment, and an explanation in this regard will not be repeated.

According to this embodiment of the present invention, the power level detector 130 may include a power module 132 and a detection module 134. The power module 132 and the detection module 134 are electrically coupled to each other, and are implemented using electrical circuits.

The power module 132 may provide a voltage to the mainboard 104. When the power module 132 provides a voltage to the mainboard 104, the detection module 134 may detect a current which is supplied to the mainboard 104 so that the present power level of the mainboard 104 is measured and obtained. The detection module 134 may then provide the present power level of the mainboard 104 to the logic device 120.

The logic device 120 may include a switch control module 122, a threshold module 124, a comparison module 126, an alert module 128, a switch SW1, and a switch SW2.

According to this embodiment of the present invention, the comparison module 126 receives the present power level of the mainboard 104 from the detection module 134, and compares the present power level of the mainboard 104 with the present power level threshold of the mainboard 104. The comparison module 126 provides a comparison signal to the alert module 128 according to the comparison between the present power level of the mainboard 104 with the present power level threshold of the mainboard 104. For example, when the present power level of the mainboard 104 is larger than the present power level threshold, the comparison module 126 may provide a comparison signal with a first logic level (e.g., logic level 1) to the alert module 128. When the present power level of the mainboard 104 is not larger than the present power level threshold of the mainboard 104, the comparison module 126 may provide a comparison signal with a second logic level (e.g., logic 0) to the alert module 128.

The alert module 128 receives the comparison signal from the comparison module 126, determines whether to generate an alert signal according to the comparison signal, and provides the alert signal (when generated) to the switch SW2. For example, when the comparison signal has the first logic level, the alert module 128 provides the alert signal to the switch SW2, and when the comparison signal has the second logic level, the alert module 128 does not provide the alert signal to the switch SW2.

The switch SW2 may be used to receive the alert signal, and selectively provide the alert signal to the computer controller 102 or the BMC 110.

The switch SW1 may be used to selectively receive a new power level threshold from computer controller 102 or BMC 110, and may provide the new power level threshold to the threshold module 124.

The threshold module 124 may be used to receive the new power level threshold, and updates the power level threshold of the mainboard 104 according to the new power level threshold. The threshold module 124 also provides the power level threshold of the mainboard 104 to the computer controller 102, the BMC 110, and the comparison module 126.

According to this embodiment of the present invention, the computer controller 102 provides a control signal to the switch SW1 and the switch SW2 through the switch control module 122 so as to determine the operating state of the logic device 120.

In greater detail, when the computer controller 102 provides a control signal having a first logic level (e.g., logic 1) to the switch SW1 and the switch SW2 through the switch control module 122, the logic device 120 is in a first operating state, and both the switch SW1 and the switch SW2 are in a first switch state. At this time, the switch SW2 is used only to provide the alert signal to the BMC 110, and the switch SW1 is used only to receive a new power level threshold from BMC 110. In contrast, when the computer controller 102 provides a control signal having a second logic level (e.g., logic 0) to the switch SW1 and the switch SW2, the logic device 120 is in a second operating state, and both the switch SW1 and the switch SW2 are in a second switch state. At this time, the switch SW2 is used only to provide the alert signal to the computer controller 102, and the switch SW1 is used only to receive a new power level threshold from the computer controller 102.

Through the aforementioned configuration and operation, the computer controller 102 may switch the operating states of the logic device 120 as needed to prevent a situation in which the system controller 102 fails to timely deal with abnormal power level conditions of the mainboard 104 and to improve stability of the computer system 100.

In the following, an operating method is disclosed to further illustrate the present invention in detail. The operating method of the present invention may be applied to any device which is similar to or the same as the computer system 100 of FIG. 1. For simplicity, the following is a description of the operating method according to an embodiment of the present invention, in which the operating method is described in relation to the computer system 100 of FIG. 1. The scope of the present invention is not limited to this embodiment.

Moreover, it is noted that the sequence of the steps of the operating method in the embodiment, except when explicitly set forth, may be varied in practice as needed, and all or part of steps may be concurrently executed.

Figure 3:
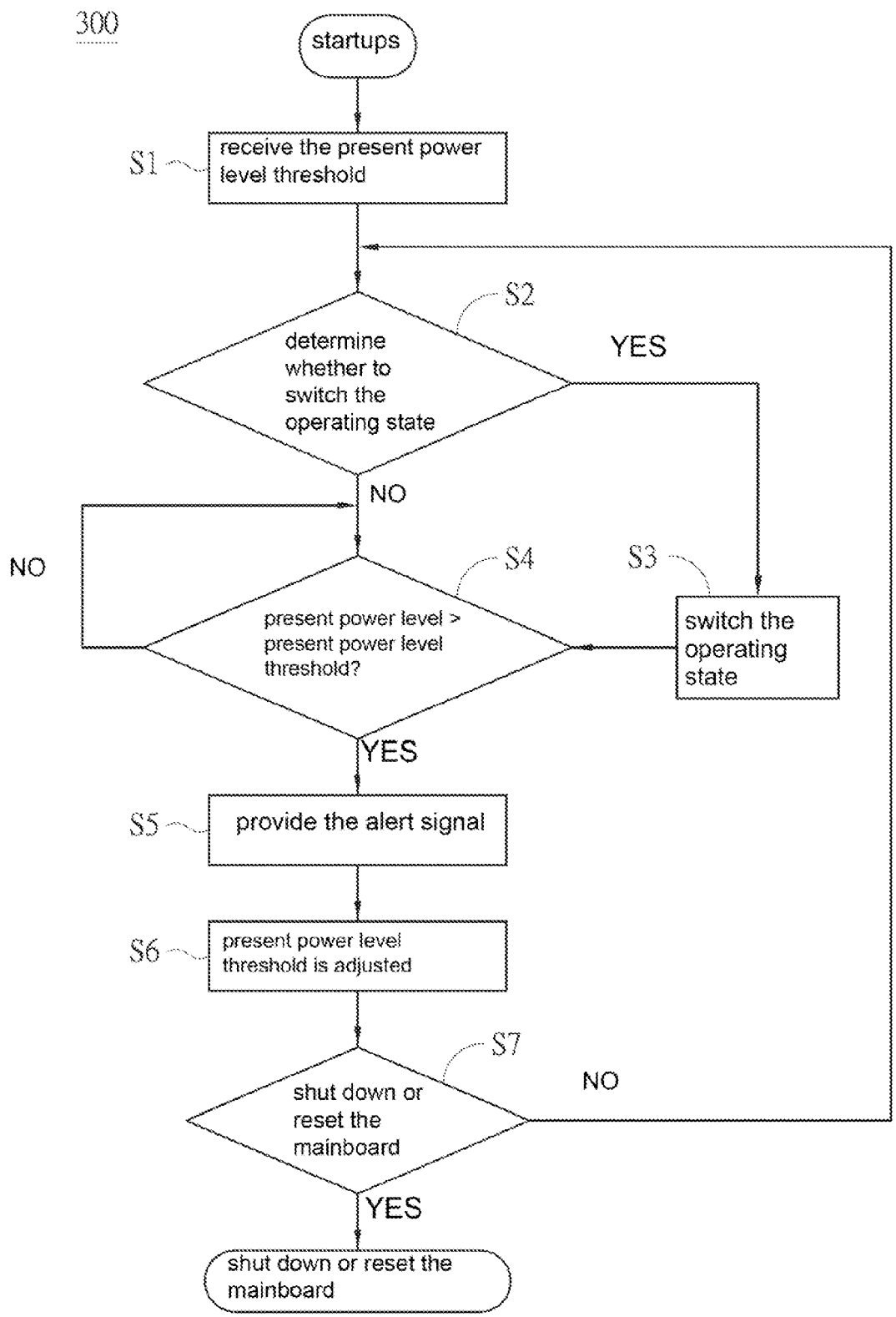
FIG. 3 is a flowchart illustrating an operating method for a computer system according to one embodiment of the present invention.

Reference is now made to FIGS. 1 and 3, in which FIG. 3 is a flowchart illustrating an operating method 300 for the computer system according to one embodiment of the present invention. The operating method may include the steps as outlined below.

At Step S1, after the computer system 100 is turned on, the power level detector 130 detects the present power level threshold of the mainboard 104, and provides the present power level threshold of the mainboard 104 to the logic device 120. The logic device 120 may receive the present power level threshold of the mainboard 104 provided from the power level detector 130.

At Steps S2 and S3, the computer controller 102 determines the operating state of the logic device 120 according to the overall operating state of the computer system 100.

That is, at Step S2, the computer controller 102 determines whether to switch the operating state of the logic device 120 (e.g., the first operating state is switched to the second operating state, or the second operating state is switched to the first operating state) according to the overall operating state of the computer system 100. If yes, the operating method proceeds to Step S3, and if no, the operating method proceeds to Step S4. It is noted that detailed information of the first and second operating states can be ascertained from the description of the aforementioned embodiment, and a description in this regard will not be repeated.

At Step S3, the computer controller 102 performs control to switch the operating state of the logic device 120.

At Step S4, the logic device 120 determines whether the present power level of the mainboard 104 is larger than the present power level threshold of the mainboard 104. If yes, the operating method proceeds to Step S5; if no, the operating method returns to Step S4 to repeat Step S4.

At Step S5, when the present power level of the mainboard 104 is larger than the present power level threshold of the mainboard 104, the logic device 120 selectively provides the alert signal to the computer controller 102 or the BMC 110.

At Step S6, the computer controller 102 or the BMC 110, whichever receives the alert signal, performs suitable control according to the alert signal (e.g., the present power level threshold of the mainboard 104 is adjusted to correspond to actual operating conditions).

At Step S7, one of the logic device 120, the computer controller 102, and the BMC 110 may determine whether to shut down or reset the mainboard 104. If yes, shut down or reset of the mainboard 104 is performed; if no, the operating method returns to Step S2.

Through the foregoing steps, when the computer controller 102 is overloaded or before the computer controller 102 is reset, the computer controller 102 may quickly switch the operating state of the logic device 120 (e.g., the second operating state is switched to first the operating state) so that the logic device 120 provides the alert signal to the BMC 110. In addition, after the computer controller 102 restores to normal or is reset, the computer controller 102 may also switch the operating state of the logic device 120 (e.g., the first operating state is switched to the second operating state), such that the logic device 120 provides the alert signal to the computer controller 102.

Furthermore, through the foregoing operation, the computer controller 102 may determine the operating state of the logic device 120 such that the BMC 110 acts for the computer controller 102, and receives the alert signal and adjusts the present power level threshold of the mainboard 104. Thus, the computer system 100 may flexibly manage the power level to prevent a situation in which the system controller 102 fails to timely deal with abnormal power level conditions of the mainboard 104 and to improve stability of the computer system 100.

The following is a detailed description of the aforementioned operating method 300, and the scope of the present invention is not limited to this embodiment.

According to the embodiment of the present invention, at Step S2, the logic device 120 may provide the present power level threshold of the mainboard 104 to the computer controller 102 and the BMC 110 so that both the computer controller 102 and the BMC 110 may be timely aware of the present power level threshold of the mainboard 104.

Therefore, at Step S2, the computer controller 102 may determine whether to switch the operating state of the logic device 120 according to the present power level threshold of the mainboard 104.

For example, when the present power level threshold of the mainboard 104 is larger than a predetermined threshold (e.g., 150W), this indicates that the mainboard 104 has a somewhat heavy load, necessitating timely and proper control according to the alert signal so as to prevent a fault. Thus, the computer controller 102 may set the operating state of the logic device 120 to the first operating state. At Step S5, the logic device 120 timely provides the alert signal to the BMC 110 so that the BMC 110 adjusts the present power level threshold of the mainboard 104 according to the alert signal (Step S6).

When the present power level threshold of the mainboard 104 is not larger than a predetermined threshold, this indicates that the mainboard 104 has a low load. As a result, the computer controller 102 may set the operating state of the logic device 120 to the second operating state. Thus, at Step S6, the logic device 120 timely provides the alert signal to the computer controller 102 so that the computer controller 102 adjusts the present power level threshold of the mainboard 104 according to the alert signal (Step S6).

According to the embodiment of the present invention, at Step S3, the computer controller 102 may further provide the control signal to at least one switch of the logic device 120 (e.g., the switch SW2 or the switch SW3 of FIG. 2) so as to determine the operating state of the logic device 120 (e.g., the logic device 120 is controlled to the first operating state or the second operating state).

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An operating method for a computer system including a system controller and a mainboard, and the mainboard including a baseboard management controller and a logic device, the method comprising:
   determining an operating state of the logic device by the system controller;
   receiving a present power level of the mainboard by the logic device;
   comparing the present power level of the mainboard with a present power level threshold of the mainboard, and determining whether to generate an alert signal by the logic device according to the comparison between the present power level and the present power level threshold;
   selectively providing the alert signal to the system controller or the baseboard management controller according to the operating state by the logic device; and
   adjusting the present power level threshold of the mainboard in accordance with the alert signal by the system controller or the baseboard management controller, whichever receives the alert signal;
   wherein the step of determining the operating state of the logic device comprises:
      providing the present power level of the mainboard to the system controller by the logic device; and
      determining the operating state of the logic device according to the present power level of the mainboard by the system controller;
   wherein the step of determining the operating state of the logic device according to the present power level of the mainboard further comprises:
      configuring the operating state of the logic device to a first operating state by the computer controller when the present power level threshold of the mainboard is larger than a predetermined power level threshold; and
   wherein the step of providing the alert signal to the system controller or the baseboard management controller comprises:
      providing the alert signal to the baseboard management controller by the logic device in the first operating state.

2. The operating method of claim 1, wherein the step of determining the operating state of the logic device according to the present power level of the mainboard further comprises:
   configuring the operating state of the logic device to a second operating state by the computer controller when the present power level threshold of the mainboard is not larger than the predetermined power level threshold; and
   wherein the step of providing the alert signal to the system controller or the baseboard management controller further comprises:
   providing the alert signal to the system controller by the logic device in the second operating state.

3. The operating method of claim 1, wherein the step of determining the operating state of the logic device comprises:
   providing a control signal to at least one switch of the logic device so as to determine the operating state of the logic device by the computer controller.

4. A computer system, comprising:
   a mainboard, comprising:
      a logic device receiving a present power level of the mainboard, and comparing the present power level of the mainboard with a present power level threshold of the mainboard so as to determine whether to generate an alert signal according to the comparison between the present power level and the present power level threshold; and
      a baseboard management controller; and
   a system controller determining the operating state of the logic device,
   wherein the logic device selectively provides the alert signal to the system controller or the baseboard management controller according to the operating state so that the system controller or the baseboard management controller, whichever receives the alert signal, adjusts the present power level threshold of the mainboard according to the alert signal;
   wherein the logic device further provides the present power level threshold of the mainboard to the system controller so that the system controller determines the operating state of the logic device according to the present power level threshold of the mainboard;

wherein when the present power level threshold of the mainboard is larger than a predetermined power level threshold, the operating state of the logic device is set to a first operating state by the computer controller, and wherein when the logic device is at the first operating state, the logic device provides the alert signal to the baseboard management controller.

5. The computer system of claim 4, wherein when the present power level threshold of the mainboard is not larger than a predetermined threshold, the logic device is set to the second operating state by the computer controller, and wherein when the logic device is at the second operating state, the logic device provides the alert signal to the system controller.

6. The computer system of claim 4, wherein the logic device further comprises at least one switch, and the system controller provides a control signal to the switch so as to determine the operating state of the logic device.

* * * * *